United States Patent [19]
Kain et al.

[11] 4,147,966
[45] Apr. 3, 1979

[54] MEANS FOR DIGITAL CONTROL

[75] Inventors: Per Kain; Robert Lockley, both of Västerås; Jaroslav Valis, Eskilstuna, all of Sweden

[73] Assignee: ASEA AB, Västerås, Sweden

[21] Appl. No.: 739,151

[22] Filed: Nov. 5, 1976

[30] Foreign Application Priority Data

Nov. 6, 1975 [SE] Sweden .............................. 75124271

[51] Int. Cl.² .............................................. H02P 5/00
[52] U.S. Cl. ..................................... 318/327; 318/601
[58] Field of Search ................................ 318/327, 601

[56] References Cited
U.S. PATENT DOCUMENTS

| 3,584,203 | 6/1971 | Patzelt | 318/601 |
| 3,743,906 | 7/1973 | Torok | 318/327 |
| 3,793,511 | 2/1974 | Bala et al. | 318/601 |
| 3,843,914 | 10/1974 | Carlson et al. | 318/327 |
| 3,950,682 | 4/1976 | Dohanich | 318/327 |

Primary Examiner—Robert K. Schaefer
Assistant Examiner—Eugene S. Indyk
Attorney, Agent, or Firm—Pollock, Vande Sande & Priddy

[57] ABSTRACT

A closed loop control system achieves high speed operation commensurate with low resolution A/D converters which, at the same time, is capable of accepting and using higher resolution control signals. A control loop includes a differencing device for providing an error signal produced as a difference between a reference value and an output value related to the controlled parameter, D/A converter and integrator, producing an output value for device control. The feedback loop includes an A/D converter. The reference value and reference value input to the differencing device as well as the D/A converter accept digital signals of resolution greater than those produced by the A/D converter.

4 Claims, 2 Drawing Figures

MEANS FOR DIGITAL CONTROL

BACKGROUND OF THE INVENTION

The present invention relates to a means for digital control, which means comprises a difference-forming device arranged to form an error signal constituting the difference between a reference value signal for the control object in question and an output value signal obtained from the control object, and a device integrating said error signal and arranged to emit an output signal intended for controlling a parameter of the control object.

In digital measurement the product of measurement time and resolution and accuracy, respectively, often has a constant value. This value depends on the choice and setting of the digital convertor, which converts a measured value into digital form. More particularly, high accuracy requires a long measurement time and a short measurement time gives lower accuracy. If such a convertor is used as the output value transducer, the control performance can never be better than the convertor performance.

According to the invention, a control system is obtained which has considerably higher accuracy and/or speed than that corresponding to the performance of the output value transducer itself.

BRIEF DESCRIPTION OF THE DRAWINGS

The means according to the invention will be described with reference to the accompanying drawings which illustrate an example of digital control, more specifically speed control of a DC motor, according to FIG. 1.

DETAILED DESCRIPTION

Figure 1:
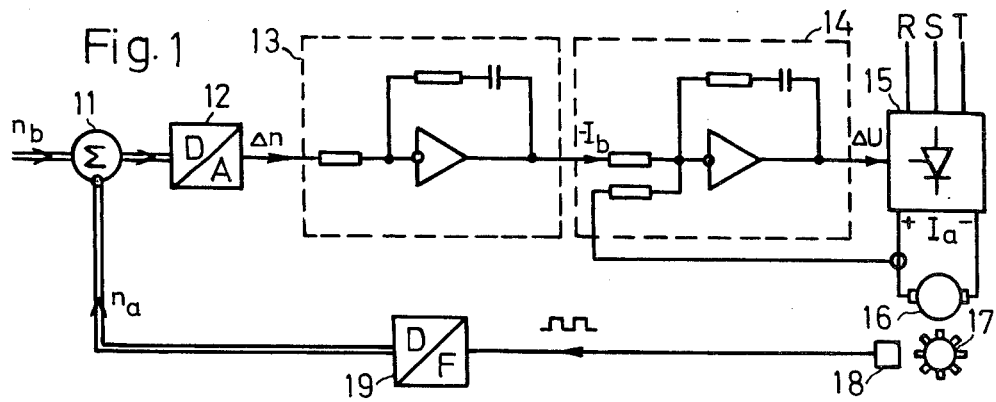

The control system of to FIG. 1 consists of a difference former 11, a digital/analogue convertor 12, an integrating device 13, a current regulator 14, a static convertor unit 15, a DC motor 16, a pulse emitter 17 with pick-up unit 18 and a frequency/digital convertor 19.

The difference former 11 is supplied with a reference value signal $n_b$ and an output value signal $n_a$. By means of the pulse emitter 17 and the pick-up unit 18 the frequency/digital convertor 19 is supplied with a pulse train, which corresponds to the real time speed of the DC motor 16. The frequency/digital convertor 19, which may advantageously consist of a convertor as described in U.S. Patent Specification 3,928,798, converts the pulse train into the digital signal $n_a$. The convertor 19 may alternatively be of another type. However, it is necessary for the convertor to possess the characteristic that the time mean value of the output signal of the convertor is proportional to the time mean value of the input signal to the convertor. Most linear convertors have this quality, as well as the convertor according to U.S. Pat. No. 3,928,798.

The digital/analogue convertor 12 converts a digital error signal, i.e., the difference between signals $n_b$ and $n_a$, to an analogous error signal $\Delta n$, which is supplied to the integrating device 13, which in turn emits a current reference value signal $-I_b$ to the current regulator 14.

The current regulator 14 is also supplied with an output value signal $I_a$ of the current and, after comparison of these signals, it emits a control signal $\Delta u$ to the static convertor unit 15, which in turn regulates the current supplied to the DC motor 16 and thus also its speed.

To illustrate the principle of the invention, assume that the digital reference value signal $n_b$ is chosen with a resolution of 15 bits and that the actual value emitters (17 and 18) have a resolution corresponding to 12 bits.

The two signals provided to the difference former 11 can then be illustrated as follows:

$$n_b = x_{01}x_{01}x_{01}x_{01}x_{01}x_{01}x_{01}x_{01}x_{01}x_{01}x_{01}x_{01}x_{01}x_{01}x_{01}$$

$$n_a = x_{01}x_{01}x_{01}x_{01}x_{01}x_{01}x_{01}x_{01}x_{01}x_{01}x_{01}x_{01}\,0\,0\,0$$

where $x_{01}$ represents arbitrarily 0 or 1 and where the last three positions of signal $n_a$ are always 0.

Figure 2:
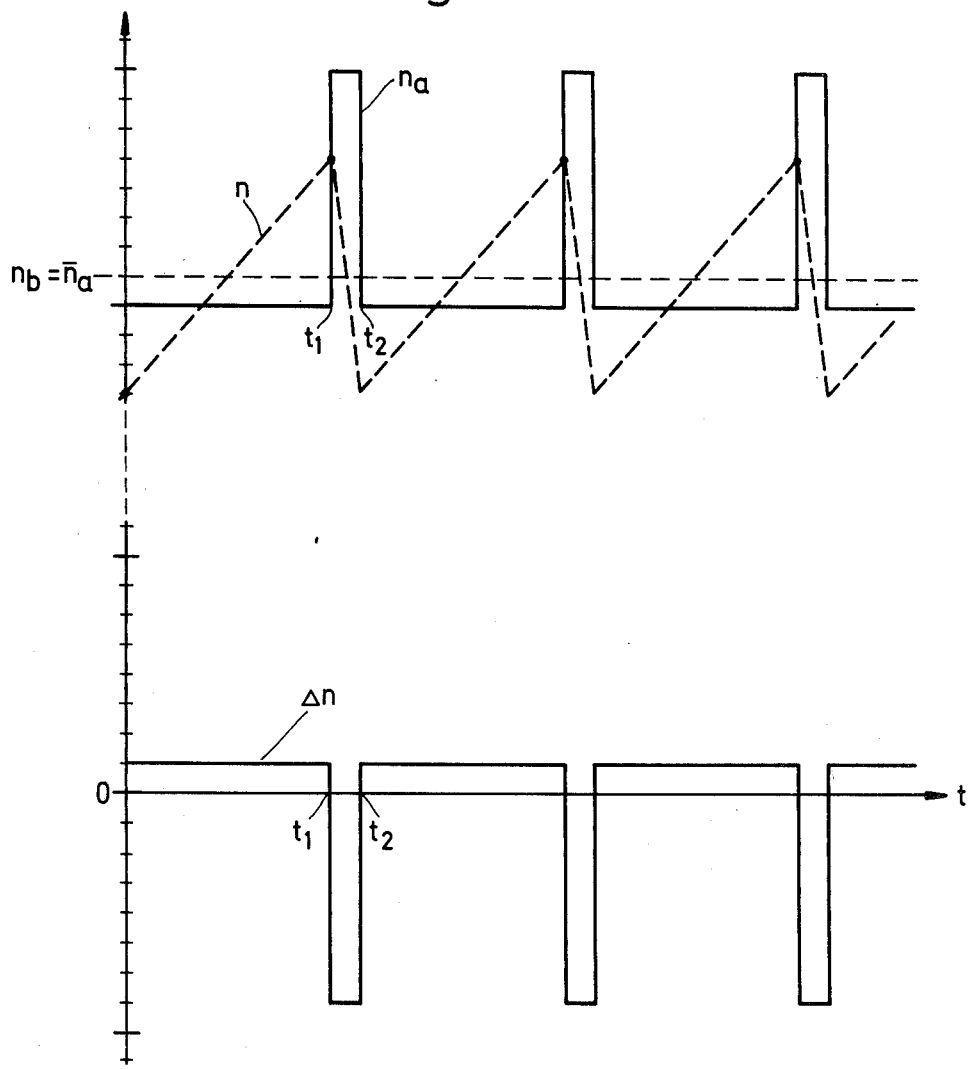
FIG. 2 shows some of the quantities occurring in the system according to FIG. 1 as functions of the time.

FIG. 2 shows the signals $n$, $n_a$, $n_b$ and $\Delta n$ as functions of the time $t$. The small dashes on the n-axis indicate values that $n_b$ may adopt. The resolution of $n_a$ is in the chosen example 3 bits lower, that is, there are $2^3 = 8$ steps of $n_b$ between each value that $n_a$ may adopt. The possible values of $n_a$ are marked by heavier dashes along the n-axis.

If it is assumed that $n_b$, during the interval $0 < t < t_1$ in FIG. 2, is one unit greater than $n_a$, that is, $$n_b = x_{01}x_{01}x_{01}x_{01}x_{01}x_{01}x_{01}x_{01}x_{01}x_{01}x_{01}x_{01}\,001$$

$$n_a = x_{01}x_{01}x_{01}x_{01}x_{01}x_{01}x_{01}x_{01}x_{01}x_{01}x_{01}x_{01}\,000$$

where all positions $x_{01}$ have assumed the same value, this gives $\Delta n = 1$ unit according to FIG. 2.

With this signal $\Delta n = 1$, the integrating device 13 is integrated until the speed of the motor has increased so that a change of the signal $n_a$ is obtained of 8 units, which corresponds to one bit on the 12-bit signal according to the above.

The output signal $\Delta n$ from the digital/analogue convertor 12 is then altered to the value $-7$ units according to $$\begin{array}{r} x_{01}x_{01}x_{01}x_{01}x_{01}x_{01}x_{01}x_{01}x_{01}x_{01}x_{01}\,001 \\ -x_{01}x_{01}x_{01}x_{01}x_{01}x_{01}x_{01}x_{01}x_{01}x_{01}x_{01}\,1\,000 \\ \hline -0\,0\,0\,0\,0\,0\,0\,0\,0\,0\,0\,0\,111 \end{array}$$

whereby the integrating device 13 during the interval $t_1 < t < t_2$ will integrate in a direction opposite to the previous direction until the speed has been reduced so that $n_a$ has resumed its original value, that is, a stable situation is achieved when the positive area c of the signal $\Delta n$ is equal to the negative area d of the same signal. Further, the time $t_1 = 7 \cdot (t_2 - t_1)$.

From FIG. 2 there is obtained a mean value $\bar{n}_a$ for signal $n_a$, which is ⅛ of 8 units, that is 1 unit, which is the same as for the reference value signal.

An analogous reasoning can be held regarding different reference value signals and by applying the means according to the invention it will be found that the mean value $n_a$ has the same resolution as the signal $n_b$.

The difference in resolution between the reference value and the output value must be chosen with regard to the variations in speed which may be allowed in the application in question.

As mentioned before, the product of measurement time and accuracy is constant. In the above-mentioned embodiment, thus, the speed of the control system is given by the speed of the frequency/digital conversion, whereas the accuracy is given by the resolution of the reference value signal.

The means according to the invention is, of course, not limited to the application shown here, but can be applied to various forms of digital control within the scope of the claim. For example, output value transducers other than the F/D convertor 19 and pick-up unit 18 may be used. As an example there may be mentioned a conventional integrating A/D convertor. The control system according to the invention may, of course, be used for control of quantities other than the speed of a motor.

We claim:

1. A digital control system for controlling a parameter of a control object in accordance with a digital reference value comprising:
   digital differencing means,
   feedback transducer means providing a digital output value in accordance with said parameter,
   said digital differencing means providing a digital error signal comprising the difference between said digital reference value and said digital output value, integrating means to integrate said error signal and emit an output value to control said parameter of said control object,
   the improvement comprising:
   said digital differencing means having a digital reference value input of greater resolution than said digital output value input and providing a digital error signal of resolution at least equal to said digital reference value.

2. The apparatus of claim 1 in which said integrating means includes a digital to analog converter having resolution at least equal to the resolution of said digital reference value.

3. The apparatus of claim 1 in which said feedback transducer means includes an analog to digital converter of resolution less than said digital reference value.

4. The apparatus of claim 3 in which said analog to digital converter is a frequency to digital converter.

* * * * *